United States Patent
Rome et al.

(10) Patent No.: US 6,595,228 B1
(45) Date of Patent: Jul. 22, 2003

(54) VEHICLE FLUID TRANSFER SYSTEM

(75) Inventors: John A. Rome, Huntington Beach, CA (US); Bill Kavadeles, Carlsbad, CA (US); Dwayne V. Gronquist, Glendale, CA (US)

(73) Assignee: Motorvac Technologies, Inc., Santa Ana, CA (US)

( * ) Notice: Subject to any disclaimer, the term of this patent is extended or adjusted under 35 U.S.C. 154(b) by 0 days.

(21) Appl. No.: 09/997,070

(22) Filed: Nov. 27, 2001

(51) Int. Cl.⁷ .................................................. B65B 1/04
(52) U.S. Cl. ...................... 137/1; 137/558; 137/565.11; 141/65; 141/98
(58) Field of Search .......................... 137/558–565.01, 137/565.11; 141/98, 65

(56) References Cited

U.S. PATENT DOCUMENTS

| | | | |
|---|---|---|---|
| 5,370,160 A | * | 12/1994 | Parker .......................... 141/98 |
| 5,511,569 A | * | 4/1996 | Mukogawa ............... 134/104.1 |
| 5,626,170 A | * | 5/1997 | Parker .......................... 141/98 |
| 6,062,275 A | * | 5/2000 | Rome et al. ............... 141/65 X |
| 6,474,370 B1 | * | 11/2002 | Betancourt et al. ....... 141/65 X |

* cited by examiner

Primary Examiner—Kevin Lee
(74) Attorney, Agent, or Firm—Farjami & Farjami LLP

(57) ABSTRACT

A fluid transfer system and method for removing and replacing fluids in a fluid system. The fluid transfer system comprises an output hose coupled to an input line of the fluid system, and a return hose coupled to an output line of the fluid system. The fluid transfer system further comprises a low-level fluid sensor capable of being installed by an operator in a clean tank, and a high-level fluid sensor capable of being installed by the operator in a waste tank. The fluid transfer system further comprises a clean fluid pump for pumping clean fluid from the clean tank to the output hose. The fluid transfer system further comprises an operator adjustable clean fluid regulator to control a flow rate of clean fluid in the output hose, and an operator adjustable waste fluid regulator to control the flow rate of waste fluid in the return hose.

21 Claims, 4 Drawing Sheets

VEHICLE FLUID TRANSFER SYSTEM

BACKGROUND OF THE INVENTION

1. Field of the Invention

The present invention relates generally to servicing vehicle fluid systems. More particularly, the present invention relates to method and apparatus for removing and replacing fluids in vehicle fluid systems.

2. Background Art

It is well known that fluid in the various fluid systems in a vehicle becomes contaminated with waste debris through normal use. As waste debris accumulates, it can form harmful deposits on the walls of internal passageways of the fluid systems. These deposits can restrict the fluid flow through the internal passageways of the fluid systems and thus shorten the life of the vehicle components, such as the vehicle engine, transmission, or radiator, which the fluid system is designed to protect. For example, accumulated oil sludge and debris in a vehicle engine lubrication system can form oil and hydrocarbon deposits on the walls of oil passageways of a vehicle engine. These oil and hydrocarbon deposits restrict oil flow through the engine and thus shorten the engine's life. Therefore, it is desirable to periodically remove contaminated fluid from the vehicle fluid systems, such as the vehicle engine lubrication system, and thereby prevent shortening of the life of the vehicle components.

In a typical vehicle fluid system servicing operation, contaminated fluid is first removed from the vehicle fluid system by unscrewing a drain plug and allowing the contaminated fluid to drain into a waste receptacle. However, valuable service time can be wasted as the service person waits for the contaminated fluid to trickle out of the vehicle fluid system. Also, the above method of removing contaminated fluid from the vehicle fluid system could result in injury to service personnel from hot vehicle and slippery system fluid, or minimally, untidiness from spilled fluid. For example, in servicing a vehicle transmission fluid system, service personnel may be burned by hot transmission fluid or may slip and fall on slippery transmission fluid. Additionally, valuable service time would have to be spent cleaning up any untidiness resulting from the spilled transmission fluid. Also, typically, most transmission pans do not include the installation of drain plugs and the operator must disassemble and remove the drain pan to allow fluid drainage, which is time consuming and would further result in spending valuable service time cleaning up any fluid spill.

Moreover, in a conventional vehicle fluid system servicing operation, contaminated fluid that is removed from the vehicle fluid system is typically disposed of by transferring the contaminated fluid from a small service receptacle into a larger waste fluid container. Since the small service receptacle only holds a small amount of waste fluid, the small service receptacle must be continually emptied into the larger waste fluid container. The above procedure is time consuming and also increases the risk of spilling contaminated fluid.

In a conventional servicing operation, after the contaminated fluid has been allowed to drain out, the vehicle fluid system is filled with fresh fluid by manually pouring the fresh fluid into a fill opening in the vehicle fluid system. By manually pouring the fresh fluid into the fill opening, the rate that the fresh fluid enters the fill opening is difficult to control and the fresh fluid may also be spilled. If the fresh fluid is poured into the fill opening too quickly, the fresh fluid can spill over the fill opening. On the other hand, if the fresh fluid is poured too slowly, the filling operation wastes valuable service time by taking too long to complete.

Thus, there is a need for a vehicle service system that can safely and quickly remove waste fluid in a vehicle fluid system. Additionally, there is a need for a vehicle service system that can quickly and efficiently replace waste fluid with fresh fluid in a vehicle fluid system.

SUMMARY OF THE INVENTION

The present invention is directed to apparatus and method for removing and replacing fluids in a fluid system. More specifically, the present invention provides a fluid transfer system for use by an operator for withdrawing a waste fluid from a fluid system and depositing the waste fluid in a waste tank while concurrently providing clean fluid from a clean tank to replace the waste fluid in the fluid system.

In one aspect, a fluid transfer system comprises an output hose capable of being coupled to an input line of the fluid system, and a return hose capable of being coupled to an output line of the fluid system. The fluid transfer system further comprises a low-level fluid sensor capable of being installed by the operator in the clean tank, and a high-level fluid sensor capable of being installed by the operator in the waste tank. The fluid transfer system may further comprise a clean fluid pump capable of pumping the clean fluid from the clean tank to the output hose.

The fluid transfer system may also comprise a clean fluid regulator capable of being adjusted by the operator to control a flow rate of the clean fluid in the output hose. The fluid transfer system may further comprise a waste fluid regulator capable of being adjusted by the operator to control a flow rate of the waste fluid in the return hose. The fluid transfer system may also comprise a clean fluid flow meter coupled to the output hose and a waste fluid flow meter coupled to the return hose.

In another aspect, the fluid transfer system comprises a filter between the clean fluid pump and the clean tank. The fluid transfer system further comprises a check valve between the clean fluid pump and the input line. The fluid transfer system may also comprise a low-level indicator that triggers when the clean fluid reaches a predetermined low level in the clean tank. The fluid transfer system may further comprise a high-level indicator that triggers when the waste fluid reaches a predetermined high level in the waste tank.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention is directed to system and method for servicing vehicle fluid systems. The present invention may be described herein in terms of functional block components and various processing steps. It should be appreciated that such functional blocks may be realized by any number of hardware components configured to perform the specified functions. It should be further appreciated that the particular implementations shown and described herein are merely exemplary and are not intended to limit the scope of the present invention in any way.

Figure 1:
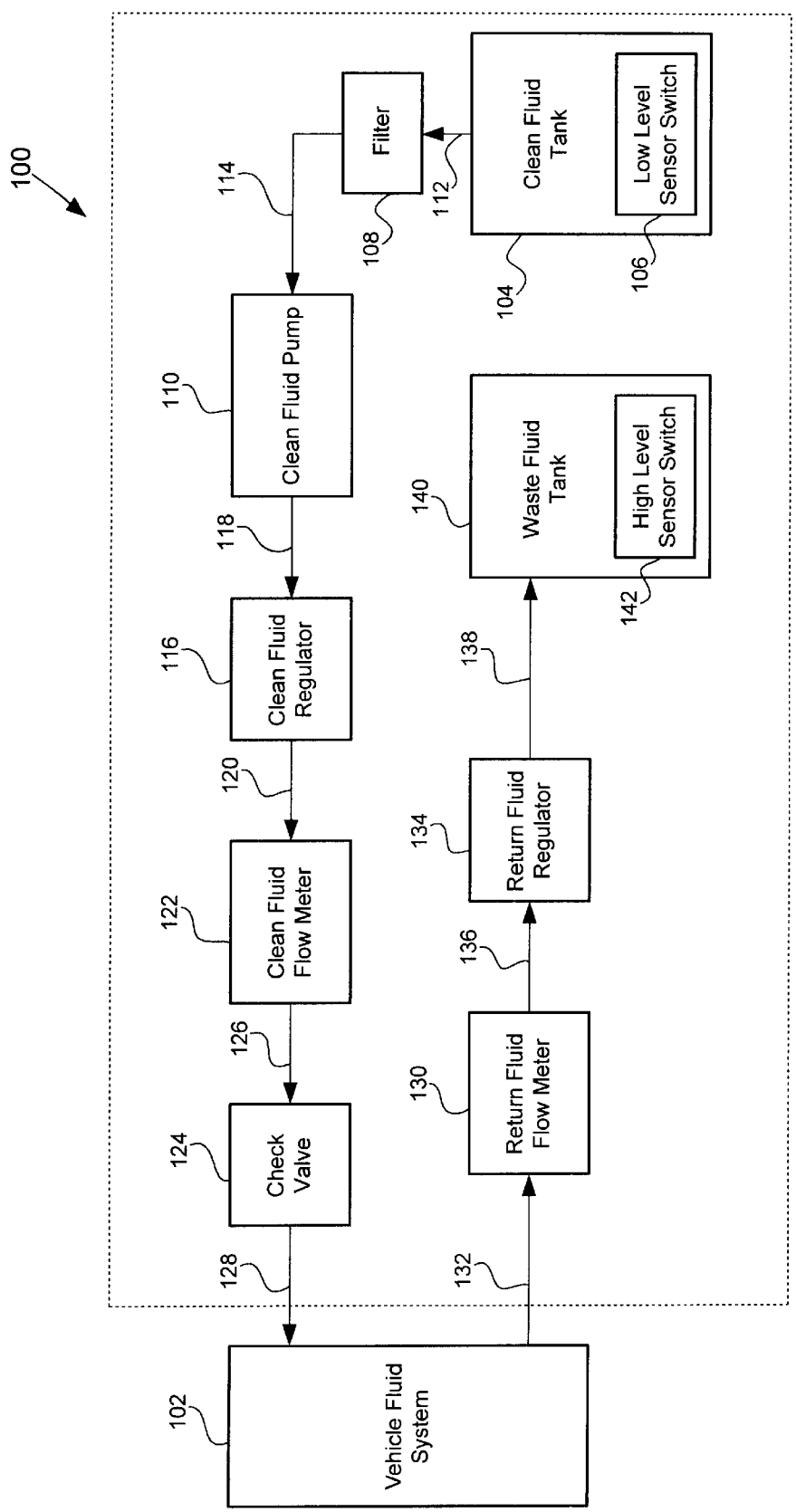
FIG. 1 illustrates a block diagram of a vehicle fluid transfer system according to one embodiment of the present invention.

FIG. 1 shows a block diagram of a vehicle fluid transfer system according to one embodiment of the present invention. As shown in FIG. 1, vehicle fluid transfer system 100 may be connected to vehicle fluid system 102. Vehicle fluid transfer system 100 can safely replace the contaminated fluids in the vehicle fluid system with fresh fluid by controlling the rate of flow of the fresh fluid entering vehicle fluid system 102 and also controlling the rate of flow of the contaminated fluid exiting vehicle fluid system 102. For example, vehicle fluid transfer system 100 can effectively remove waste oil and replace the waste oil with fresh oil in a vehicle oil lubrication system by controlling the rate of fresh oil flowing into the oil lubrication system and also controlling the rate of waste oil exiting the oil lubrication system. In other embodiments, vehicle fluid transfer system 100 can be reconfigured to remove and replace fluids in a vehicle's transmission, hydraulic, and coolant fluid systems.

Vehicle fluid transfer system 100 includes low-level sensor switch 106, or low-level indicator, which can be installed in clean fluid tank 104. For example, low-level sensor switch 106 may be installed in clean fluid tank 104 by dropping or installing low-level sensor switch 106 into clean fluid tank 104. Low-level sensor switch 106 detects when a predetermined low fluid level is reached in clean fluid tank 104. In one embodiment, low-level sensor switch 106 can trigger an audible alarm to notify an operator of a low fluid level condition in clean fluid tank 104. Low-level sensor switch 106 may be an optical, reed, proximity, magnetic or float type switch.

Clean fluid tank 104 provides a reservoir for storing clean fluid, and is coupled to vehicle fluid transfer system 100 via conduit 112. For example, clean fluid tank 104 may be used to store fresh oil, which is used to replace waste oil removed from a vehicle oil lubrication system by vehicle fluid transfer system 100. Clean fluid tank 104 can be any storage tank or storage drum that can be utilized by vehicle fluid transfer system 100 to provide a source of clean fluid. For example, clean fluid tank 104 may be a storage drum supplied by the user, which contains clean fluid. In one embodiment, clean fluid tank 104 can be situated within the structure housing vehicle fluid transfer system 100.

Vehicle fluid transfer system 100 also includes filter 108 and clean fluid pump 110. Filter 108 may be an in-line filter for protecting clean fluid pump 110 by filtering the fluid from clean fluid tank 104 to prevent foreign particles greater than a predetermined size from entering clean fluid pump 110. Filter 108 is coupled to clean fluid tank 104 by conduit 112, and is further coupled to clean fluid pump 110 by conduit 114. Clean fluid pump 110 pumps clean fluid from clean fluid tank 104 to be used by vehicle fluid transfer system 100 to replace waste fluid removed from vehicle fluid system 102. Clean fluid pump 110 can be a 12.0 vdc single diaphragm pump capable of pumping 0.5 to 5.0 gallons per minute ("GPM"). In one embodiment, clean fluid pump 110 may be a dual diaphragm air driven pump for providing a high volume of fluid flow for large applications. In another embodiment, clean fluid pump 110 may be a high displacement centrifugal impeller pump for displacing and transferring high fluid flow rates.

Vehicle fluid transfer system 100 further includes clean fluid regulator 116, which is coupled to clean fluid pump 110 by conduit 118. Clean fluid regulator 116 provides a means for controlling the rate of flow and displacement of clean fluid in vehicle fluid transfer system 100. For example, clean fluid regulator 116 can be a manually adjustable regulator that allows the rate of flow of clean fluid flowing through clean fluid regulator 116 to be adjusted by turning a knob on clean fluid regulator 116. Vehicle fluid transfer system 100 also includes clean fluid flow meter 122, which is connected to clean fluid regulator 116 via conduit 120. Clean fluid flow meter 122 provides a means for visually monitoring and determining the rate of flow of clean fluid flowing through vehicle fluid transfer system 100. For example, clean fluid flow meter 122 may include a clear tube with a meter scale printed on the clear tube to allow the rate of flow of clean fluid flowing through the clear tube to be visually determined.

Vehicle fluid transfer system 100 also includes check valve 124, which is coupled to clean fluid flow meter 122 via conduit 126. Check valve 124 provides one-way directional control of clean fluid flow in vehicle fluid transfer system 100 by preventing clean fluid from flowing back through conduit 126. Check valve 124 is connected to vehicle fluid system 102 by output hose 128, which allows clean fluid to flow into vehicle fluid system 102. In one embodiment, while servicing a vehicle engine lubrication system, clean oil flows into the input line (not shown) of the vehicle engine lubrication system via output hose 128.

Vehicle fluid transfer system 100 further includes return fluid flow meter 130, which is coupled to an output line (not shown) of vehicle fluid system 102 via return hose 132. Return hose 132 allows return fluid (e.g. waste fluid) from vehicle fluid system 102 to enter vehicle fluid transfer system 100. Return fluid flow meter 130 provides a means for visually monitoring and determining the rate of flow of waste fluid flowing through vehicle fluid transfer system 100. For example, return fluid flow meter 130 may include a clear tube with a meter scale printed on the clear tube to allow the rate of flow of waste fluid flowing through the clear tube to be visually determined.

Vehicle fluid transfer system 100 also includes return fluid regulator 134, which is connected to return fluid flow meter 130 by conduit 136. Return fluid regulator 134 provides a means for controlling the rate of flow of return waste fluid from vehicle fluid system 102 flowing in vehicle fluid transfer system 100. For example, return fluid regulator 134 can be a manually adjustable regulator that allows the rate of flow of waste fluid flowing through return fluid regulator 134 to be adjusted by turning a knob on return fluid regulator 134. Return fluid regulator 134 is coupled to waste fluid tank 140 by waste fluid hose 138.

Waste fluid tank 140 provides a receptacle for receiving and storing waste fluid from vehicle fluid system 102 via waste fluid hose 138. Waste fluid hose 138 can be disconnected from waste fluid tank 140 to allow waste fluid tank 140 to be moved or emptied. Waste fluid tank 140 can be any waste storage tank or waste storage drum that may be utilized by vehicle fluid transfer system 100 to receive and store waste fluid from vehicle fluid system 102. For example, waste fluid tank 140 may be a storage drum supplied by the user for storing waste fluid. In one embodiment, waste fluid tank 140 can be situated within the structure housing vehicle fluid transfer system 100.

Vehicle fluid transfer system 100 further includes high-level sensor switch 142, or high-level indicator, which can be installed in waste fluid tank 140. For example, high-level sensor switch 142 may be installed in waste fluid tank 140 by dropping or installing high-level sensor switch 142 into waste fluid tank 140. High-level sensor switch 142 detects when a predetermined high fluid level is reached in waste fluid tank 140. In one embodiment, high-level sensor switch 142 can trigger an audible alarm to notify an operator of a high fluid level condition in waste fluid tank 140. High-level sensor switch 142 may be an optical, reed, proximity, magnetic or float type switch.

The structure housing vehicle fluid transfer system 100, not shown in FIG. 1, may be a cabinet comprising a material such as sheet metal, plastic or a composite material. In one embodiment, the above cabinet may also house clean fluid tank 104. In one embodiment, vehicle fluid transfer system 100 may be housed in a portable cabinet comprising a material such as sheet metal, plastic or a composite material.

Figure 2:
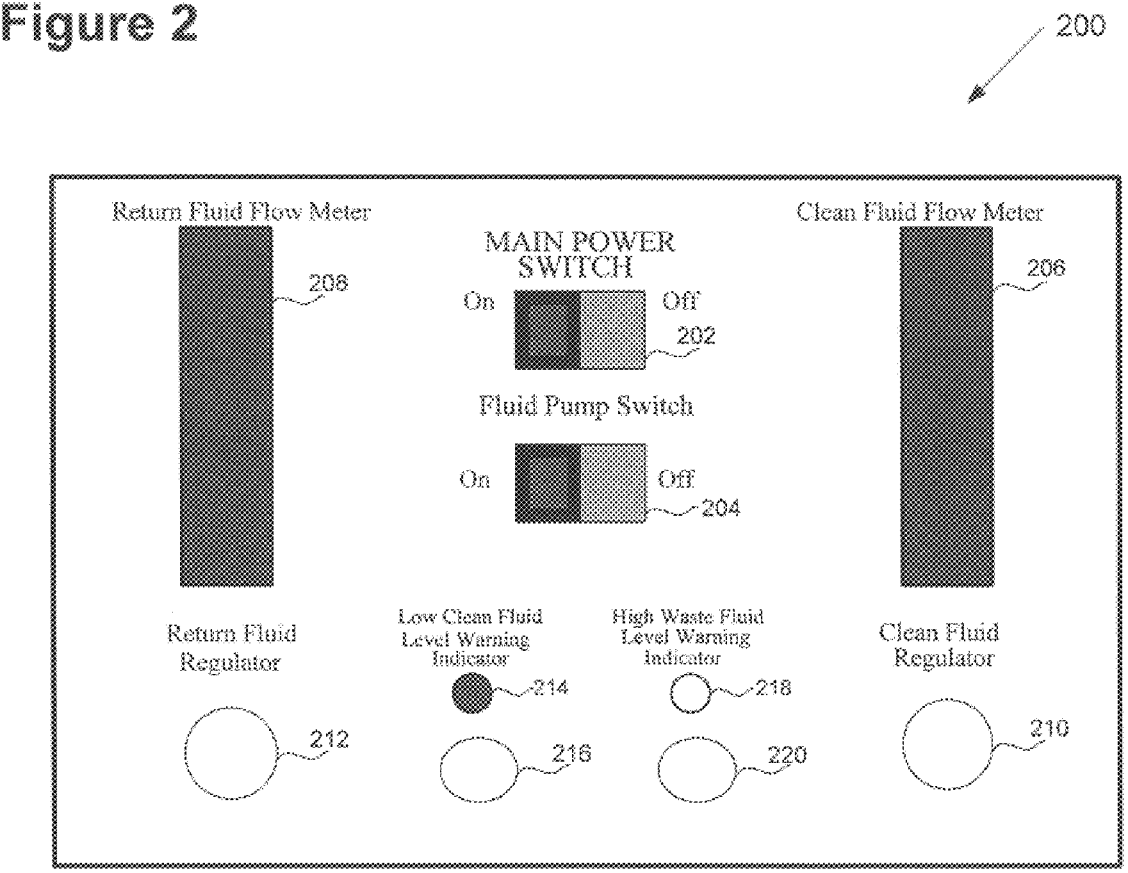
FIG. 2 illustrates a control panel of the vehicle fluid transfer system of FIG. 1.

Control panel 200 in FIG. 2 shows an exemplary control panel in accordance with one embodiment of the present invention. Control panel 200 includes main power switch 202 for turning vehicle fluid transfer system 100 in FIG. 1 on and off. Control panel 200 also includes fluid pump switch 204 for turning a clean fluid pump, such as clean fluid pump 110 in FIG. 1, on and off. Control panel 200 further includes clean fluid flow meter 206 for visually monitoring and determining the rate of flow of clean fluid flowing through vehicle fluid transfer system 100 in FIG. 1.

Control panel 200 also includes return fluid flow meter 208 for visually monitoring and determining the rate of flow of waste fluid flowing through vehicle fluid transfer system 100. Control panel 200 further includes clean fluid regulator 210 for controlling the rate of flow of clean fluid in vehicle fluid transfer system 100. For example, clean fluid regulator 210 can include a knob that can be turned to adjust the rate of flow of clean fluid in vehicle fluid transfer system 100.

Control panel 200 further includes return fluid regulator 212 for controlling the rate of flow of waste fluid in vehicle fluid transfer system 100. For example, similar to clean fluid regulator 210, return fluid regulator 212 can also include a knob that can be turned to adjust the rate of flow of waste fluid in vehicle fluid transfer system 100. Control panel 200 also includes low clean fluid level warning indicator 214 for providing a visual warning of a low clean fluid level condition in vehicle fluid transfer system 100. For example, low clean fluid level warning indicator 214 can light to signal a low clean fluid level condition in clean fluid tank 104 in FIG. 1 whenever the level of clean fluid in clean fluid tank 104 falls below a predetermined level.

Control panel 200 further includes alarm 216 for providing an audible warning signal indicating a low clean fluid level condition in vehicle fluid transfer system 100. For example, alarm 216 can sound whenever the level of clean fluid in clean fluid tank 104 falls below a predetermined level. Control panel 200 also includes high waste fluid level warning indicator 218 for providing a visual warning of a high waste fluid level condition in vehicle fluid transfer system 100. For example, high waste fluid level warning indicator 218 can light to signal a high waste fluid level condition in waste fluid tank 140 in FIG. 1 whenever the level of waste fluid in waste fluid tank 140 rises above a predetermined level.

Control panel 200 also includes alarm 220 for providing an audible warning signal indicating a high waste fluid level condition in vehicle fluid transfer system 100. For example, alarm 220 can sound whenever the level of waste fluid in waste fluid tank 140 rises above a predetermined level.

Figure 3:
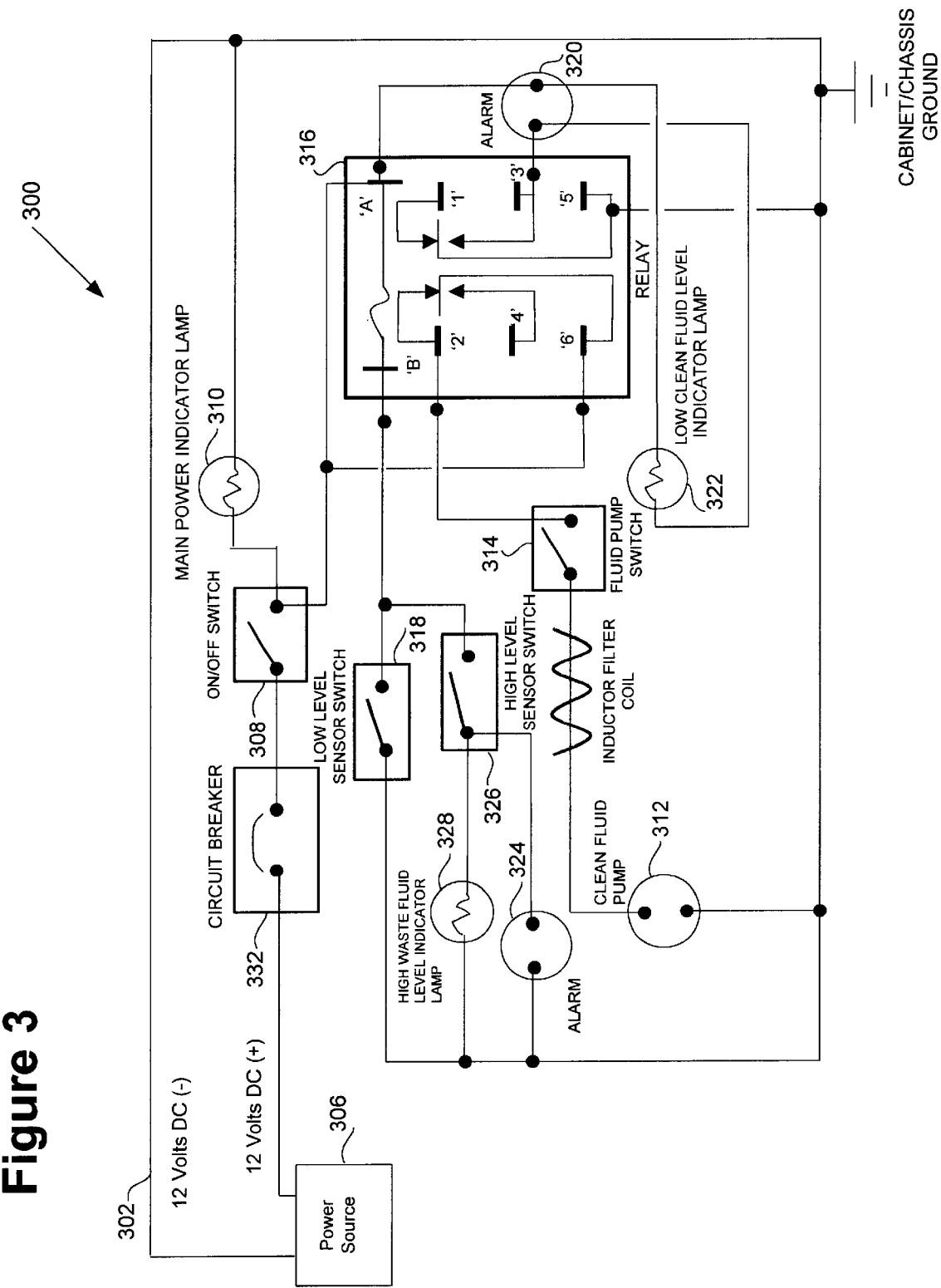
FIG. 3 illustrates an electrical schematic diagram of the vehicle fluid transfer system of FIG. 1.

Referring now to FIG. 3, electrical schematic 300 is shown for one embodiment of the present invention. Electrical schematic 300 shows negative power cable 302 and positive power cable 304 connected to power source 306. Power source 306 provides 12.0 vdc power to vehicle fluid transfer system 100. Power source 306 can be a car battery. In one embodiment, power source 306 can be a 110.0/120.0 vac 50.0 or 60.0 cycle power source containing a 12.0 vdc power supply. It should be noted that in other embodiments power source 306 can be a 220.0/240.0 vac 50.0 or 60.0 cycle power source containing a 12.0 vdc power supply, or a 24.0 or 36.0 vdc power source that is converted to 12.0 vdc by a step-down DC to DC voltage converter.

Electrical schematic 300 shows ON/OFF switch 308 for controlling 12.0 vdc power to vehicle fluid transfer system 100. Electrical schematic 300 also shows main power indicator lamp 310 wired in series with ON/OFF switch 308 so that main power indicator lamp 310 is lit whenever ON/OFF switch 308 is in the "on" position. Electrical schematic 300 further shows clean fluid pump 312 wired in series with fluid pump switch 314. Fluid pump switch 314 is also wired in series with terminals "2" and "6" of relay 316. Terminal "6" of relay 316 is connected to ON/OFF switch 308. Thus, when ON/OFF switch 308 is in the "on" position and fluid pump switch 314 is shorted, 12.0 vdc is applied to clean fluid pump 312 and clean fluid pump 312 turns on.

Relay 316 can be, for example, a 12.0 vdc relay capable of handling enough power to power clean fluid pump 312. In one embodiment, relay 316 can be a 12.0 vdc relay with a current rating of 15.0 amperes and a voltage rating of 30.0 vdc. Electrical schematic 300 also shows low-level sensor switch 318, which is wired in series with terminals "A" and "B" of relay 316. When ON/OFF switch 318 is in the "on" position, 12.0 vdc is applied to terminal "A" of relay 316. Thus, when low-level sensor switch 318 is shorted, terminal "B" of relay 316 is connected to chassis ground, i.e. the negative terminal of power source 306, and relay 316 is energized. For example, low-level sensor switch 318 will short whenever the clean fluid level in clean fluid tank 104 in FIG. 1 falls below a predetermined level.

When relay 316 is energized, terminals "3" and "5" of relay 316 are shorted together, one terminal of alarm 320 is connected to chassis ground. The other terminal of alarm 320 is connected in series with ON/OFF switch 308. Thus, when low-level sensor switch 318 is shorted and ON/OFF switch 308 is in the "on" position, relay 316 will energize and turn on alarm 320. When alarm 320 turns on, alarm 320 can signal a low clean fluid level condition in a clean fluid tank, such as clean fluid tank 104 in FIG. 1, by emitting an audible sound. Also, when alarm 320 turns on, low clean fluid level indicator lamp 322, which is wired in parallel with alarm 320, lights to provide a visual indication of a low clean fluid level condition.

Electrical schematic 300 also shows alarm 324, which is wired in series with high-level sensor switch 326, terminals "A" and "B" of relay 316, and ON/OFF switch 308. Thus, when ON/OFF switch 308 is in the "on" position and high-level sensor switch 326 is shorted, alarm 324 turns on. For example, high-level sensor switch 326 will short whenever the waste fluid level in waste fluid tank 140 in FIG. 1 rises above a predetermined level. When alarm 324 turns on, alarm 324 can signal a high waste fluid level condition in a waste fluid tank, such as waste fluid tank 140 in FIG. 1, by emitting an audible sound. In one embodiment, alarm 320 can have a sound with a different, pitch than alarm 324 to allow an operator to identify whether low-level sensor switch 318 or high-level sensor switch 326 has been activated. Also, when alarm 324 turns on, high waste fluid level indicator lamp 328, which is wired in parallel with alarm 324, lights to provide a visual indication of a high waste fluid level condition.

Electrical schematic 300 further shows inductor filter coil 330 for filtering electromagnetic interference ("EMI") emitted by clean fluid pump 312. Inductor filter coil 330 may be a wire pass-through filter. Electrical schematic 300 also shows circuit breaker 332 wired in series with power source 306 in order to protect all electrical components of electrical schematic 300. Circuit breaker 332, for example, can be a fuse of a proper rating or a standard switch type circuit. In one embodiment, circuit breaker 332 may be a standard switch type circuit with a maximum current rating of 15.0 amperes.

Figure 4:
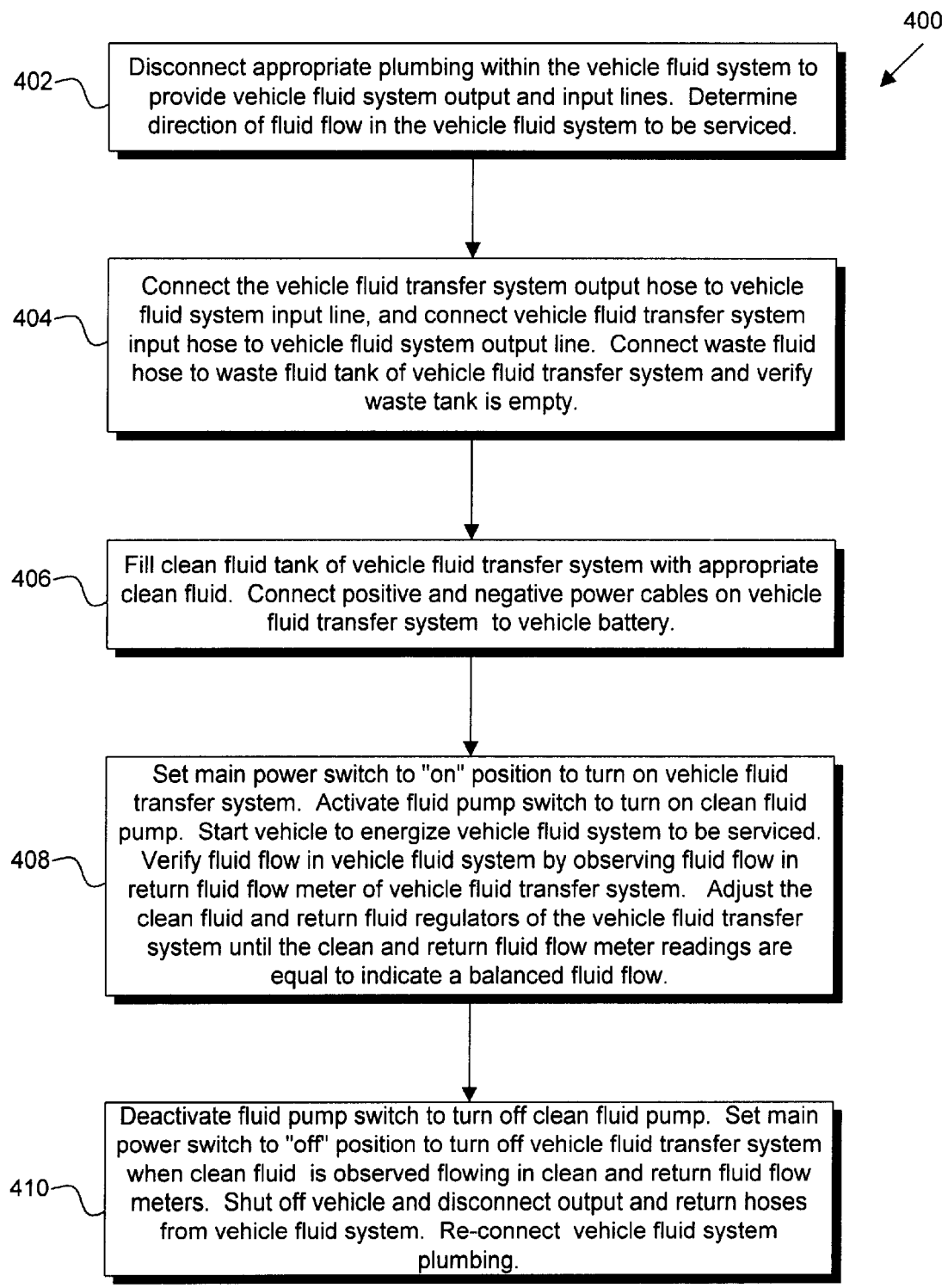
FIG. 4 illustrates a flow diagram of an exemplary method of using the vehicle fluid transfer system of FIG. 1.

FIG. 4 shows flowchart 400 for describing example steps for servicing a vehicle fluid system using vehicle fluid transfer system 100. For example, vehicle fluid transfer system 100 can be used to service a vehicle lubrication, transmission, hydraulic or coolant fluid system. As shown in FIG. 4, in step 402, the appropriate plumbing in the vehicle fluid system is disconnected to provide a vehicle fluid system output and input lines. Next, the direction of fluid flow in the vehicle fluid system to be serviced is determined. For example, the direction of fluid flow in the vehicle fluid system to be serviced can be determined by connecting the vehicle fluid system output and input lines to a fluid flow indicator loop as described in application Ser. No. 09/932, 187, filed on Aug. 17. 2001, entitled "Flow Direction Indicator Loop," and hereby incorporated by reference in the present application.

In step 404, output hose 128 and return hose 132 of vehicle fluid transfer system 100 are connected to the vehicle fluid system input and output lines, respectively. Waste fluid hose 138 is connected to waste fluid tank 140, and waste fluid tank 140 may be checked to ensure that waste fluid tank 140 is empty. In one embodiment, low-level sensor switch 106 is dropped into clean fluid tank 104 supplied by the user and high-level sensor switch 142 is dropped into waste fluid tank 140 supplied by the user. In other embodiments, vehicle fluid transfer system 100 includes clean fluid tank 104 and waste fluid tank 140 with low-level sensor switch 106 and high-level sensor switch 142, respectively, pre-installed.

In step 406, clean fluid tank 104 may be filled with the appropriate amount of clean fluid. For example, if a vehicle oil lubrication system were being serviced, clean fluid tank 104 would be filled with clean oil. Next, negative power cable 302 and positive power cable 304 in FIG. 3, respectively, can be connected to the negative and positive terminals of the vehicle battery. In step 408, main power switch 202 in FIG. 2 can be set to "on" position to turn on vehicle fluid transfer system 100. Next, activate fluid pump switch 204 to turn on clean fluid pump 110. At this point, the vehicle can be started to energize the vehicle fluid system to be serviced. For example, if a vehicle coolant fluid system were being serviced, the vehicle would be started to run the water pump that circulates coolant throughout the coolant fluid system.

Fluid flow in the vehicle fluid system to be serviced can be verified by observing fluid flow in return fluid flow meter 130. Next, clean fluid regulator 116 and return fluid regulator 134 in FIG. 1 can be adjusted to obtain a balanced fluid flow in vehicle fluid transfer system 100. For example, clean fluid regulator 116 and return fluid regulator 134, respectively, can be adjusted until clean fluid flow meter 122 and return fluid flow meter 130 indicate equal meter readings. When the meter reading indicated by clean fluid flow meter 122 is equal to the meter reading indicated by return fluid flow meter 130, the fluid flow in vehicle fluid transfer system 100 is balanced.

In step 410, when clean fluid is observed flowing in both clean fluid flow meter 122 and return fluid flow meter 130, servicing of the vehicle fluid system is completed. At this point, fluid pump switch 204 may be deactivated to turn off clean fluid pump 110. Next, main power switch 202 in FIG. 2 can be set to the "off" position to turn off vehicle fluid transfer system 100. The vehicle can be turned off, and output hose 128 and return hose 132 are disconnected from the vehicle fluid system. Vehicle fluid system plumbing is re-connected to restore the vehicle fluid system to a normal operating condition. If low-level sensor switch 106 and high-level sensor switch 142 were dropped in user supplied tanks, then low-level sensor switch 106 and high-level sensor switch 142 are removed from clean fluid tank 104 and waste fluid tank 140, respectively.

A novel method and system for transferring fluid in a vehicle fluid system has been hereby presented. The present invention may be embodied in other specific forms without departing from its spirit or essential characteristics. The described embodiments are to be considered in all respects only as illustrative and not restrictive. Those skilled in the art will recognize that changes and modifications may be made to the embodiments without departing from the scope of the present invention. These and other changes or modifications are intended to be included within the scope of present invention, as broadly described herein.

We claim:

1. A fluid transfer system for use by an operator for withdrawing a waste fluid from a fluid system and depositing said waste fluid in a waste tank while concurrently providing a clean fluid from a clean tank to replace said waste fluid in said fluid system, said fluid transfer system comprising:

an output hose capable of being coupled to an input line of said fluid system;

a return hose capable of being coupled to an output line of said fluid system;

a low-level fluid sensor capable of being installed by said operator in said clean tank;

a high-level fluid sensor capable of being installed by said operator in said waste tank;

a clean fluid pump capable of pumping said clean fluid from said clean tank to said output hose;

a clean fluid regulator capable of being adjusted by said operator to control a flow rate of said clean fluid in said output hose; and a waste fluid regulator capable of being adjusted by said operator to control a flow rate of said waste fluid in said return hose.

2. The fluid transfer system of claim 1 further comprising:

a clean fluid flow meter coupled to said output hose; and a waste fluid flow meter coupled to said return hose.

3. The fluid transfer system of claim 1 further comprising a filter between said clean fluid pump and said clean tank.

4. The fluid transfer system of claim 1 further comprising a check valve between said clean fluid pump and said input line.

5. The fluid transfer system of claim 1 further comprising a low-level indicator, wherein said low-level indicator triggers when said clean fluid reaches a predetermined low level in said clean tank.

6. The fluid transfer system of claim 1 further comprising a high-level indicator, wherein said high-level indicator triggers when said waste fluid reaches a predetermined high level in said waste tank.

7. The fluid system of claim 1, wherein said operator installs said low-level fluid sensor in said clean tank and said high-level fluid sensor in said waste tank and couples said output hose to said input line and said return hose to said output line.

8. A method of fluid transfer for replacing a waste fluid in a fluid system with a clean fluid in a clean tank, said method comprising the steps of:

coupling an output hose to an input line of said fluid system;

coupling a return hose to an output line of said fluid system;

installing a low-level fluid sensor in said clean tank;

installing a high-level fluid sensor in a waste tank;

pumping a clean fluid from said clean tank to said output hose;

adjusting a clean fluid regulator to control a flow rate of said clean fluid in said output hose;

adjusting a waste fluid regulator to control a flow rate of said waste fluid in said return hose;

receiving said waste fluid from said return line; and depositing said waste fluid into said waste tank.

9. The method of claim 8 further comprising the steps of:

monitoring said flow rate of said clean fluid in said output hose; and monitoring said flow rate of said waste fluid flow in said return hose.

10. The method of claim 8 further comprising the step of filtering said clean fluid during said pumping step.

11. The method of claim 8 further comprising the step of preventing flow of said clean fluid back to said clean tank after said pumping step.

12. The method of claim 8 further comprising the step of triggering a low-level indicator when said clean fluid reaches a predetermined low level in said clean tank.

13. The method of claim 8 further comprising the step of triggering a high-level indicator when said waste fluid reaches a predetermined high level in said waste tank.

14. A fluid transfer system for use by an operator for withdrawing a waste fluid from a fluid system while concurrently providing a clean fluid from a clean tank to replace said waste fluid in said fluid system, said fluid transfer system comprising:

an output hose capable of being coupled to an input line of said fluid system;

a return hose capable of being coupled to an output line of said fluid system;

a low-level fluid sensor capable of being installed by said operator in said clean tank;

a clean fluid pump capable of pumping said clean fluid from said clean tank to said output hose;

a clean fluid regulator capable of being adjusted by said operator to control a flow rate of said clean fluid in said output hose; and a waste fluid regulator capable of being adjusted by said operator to control a flow rate of said waste fluid in said return hose.

15. The fluid transfer system of claim 14 further comprising:

a clean fluid flow meter coupled to said output hose; and a waste fluid flow meter coupled to said return hose.

16. The fluid transfer system of claim 14 further comprising a filter between said clean fluid pump and said clean tank.

17. The fluid transfer system of claim 14 further comprising a check valve between said clean fluid pump and said input line.

18. The fluid transfer system of claim 14 further comprising a low-level indicator, wherein said low-level indicator triggers when said clean fluid reaches a predetermined low level in said clean tank.

19. A method of fluid transfer for replacing a waste fluid in a fluid system with a clean fluid in a clean tank, said method comprising the steps of:

coupling an output hose to an input line of said fluid system;

coupling a return hose to an output line of said fluid system;

installing a low-level fluid sensor in said clean tank;

pumping a clean fluid from said clean tank to said output hose;

adjusting a clean fluid regulator to control a flow rate of said clean fluid in said output hose;

adjusting a waste fluid regulator to control a flow rate of said waste fluid in said return hose;

receiving said waste fluid from said return line; and disposing said waste fluid.

20. The method of claim 19 further comprising the steps of:

monitoring said flow rate of said clean fluid in said output hose; and monitoring said flow rate of said waste fluid in said return hose.

21. The method of claim 19 further comprising the step of triggering a low-level indicator when said clean fluid reaches a predetermined low level in said clean tank.

* * * * *